United States Patent

Des Champs et al.

[15] 3,663,306

[45] May 16, 1972

[54] HIGH PRESSURE RESISTANT COMPACT HOUSING STRUCTURE

[72] Inventors: Nicholas Howard Des Champs, Reeds Ferry; Kenneth E. Mayo, Nashua; Douglas Arthur Messier, Hudson, all of N.H.; Ronald William James, Groton, Mass.

[73] Assignee: Sanders Nuclear Corporation, Nashua, N.H.

[22] Filed: Nov. 6, 1968

[21] Appl. No.: 773,782

[52] U.S. Cl. ................................................136/202, 174/17

[51] Int. Cl. ..........................................................G21h 1/10

[58] Field of Search ..........................136/202, 205, 230, 210

[56] References Cited

UNITED STATES PATENTS

| | | | |
|---|---|---|---|
| 2,938,357 | 5/1960 | Sheckler | 136/230 X |
| 3,056,848 | 10/1962 | Meyers | 136/210 |
| 3,075,030 | 1/1963 | Elm et al. | 136/208 |
| 3,197,342 | 7/1965 | Neild, Jr. | 136/210 |
| 3,262,820 | 7/1966 | Whitelaw | 136/202 |
| 3,347,711 | 10/1967 | Banks, Jr. et al. | 136/202 |
| 3,377,207 | 4/1968 | Stathoplos | 136/208 X |
| 3,378,449 | 4/1968 | Roberts et al. | 136/202 X |
| 3,401,064 | 9/1968 | Perlow et al. | 136/202 |
| 3,481,794 | 12/1969 | Kasschau | 136/208 |

*Primary Examiner*—Carl D. Quarforth
*Assistant Examiner*—Harvey E. Behrend
*Attorney*—Louis Etlinger

[57] ABSTRACT

A high pressure resistant compact housing structure is provided which is particularly useful in connection with thermoelectric radioisotope generator constructions. The housing is particularly constructed for use at high external pressures as at great depths in the ocean and is resistant to galvanic corrosion and high pressure. An outer housing shell transfers high pressures to interior structure which absorbs substantially the entire pressure load. Preferably a radioisotope heat source is enclosed in the housing. Heat at both ends of the source is utilized to obtain maximized efficiency of the source in thermoelectric conversion. A novel mounting structure for the heat source and associated thermoelectric conversion means comprises utility mounting plates and associated radiation shielding preferably incorporating a novel double seal arrangement in accordance with this invention. The construction permits low power-weight ratios in high pressure resistant radioisotope thermoelectric generators.

8 Claims, 4 Drawing Figures

Patented May 16, 1972 3,663,306

2 Sheets-Sheet 1

INVENTORS

NICHOLAS H. DESCHAMPS
KENNETH E. MAYO
DOUGLAS A. MESSIER
RONALD W. JAMES

BY Richard J. Seligman

ATTORNEY

INVENTORS
NICHOLAS H. DESCHAMPS
KENNETH E. MAYO
DOUGLAS A. MESSIER
RONALD W. JAMES
BY Richard H. Seligman
ATTORNEY

HIGH PRESSURE RESISTANT COMPACT HOUSING STRUCTURE

BACKGROUND OF THE INVENTION

There has long been a need to reduce cost and weight of underwater radioisotope thermoelectric generators for use in geophysical and ocean systems power supplies. Such generators have been developed with sufficient power outputs but usually they are of large size and weight. Size and weight are important considerations particularly in underwater power supplies since over-all costs are greatly increased as size and weight increase due to the requirements for assembling, storing, transporting and locating such generators at remote sites in the ocean.

SUMMARY OF THE INVENTION

According to the invention, a housing structure is provided preferably in a radioisotope thermoelectric generator construction which has an interior structure and an outer housing shell. The interior structure has greater compressive strength than the outer housing shell. A fluid lies within the outer housing shell so that high pressure forces acting on the outside of the shell are transmitted and supported by the interior structure. The interior support structure is preferably biological shielding material. Preferably the entire outer housing shell is formed of a corrosion-resistant high strength metal which has a predetermined portion with a thickness less than the thickness of other portions. The decreased thickness portion preferably has an oil can action to transmit high pressures acting on the outside of the housing to the interior structure thus preventing destructive compression of the structure.

Preferably a radioisotope charge is used in the housing and has a first end, a second end and an intermediate section. Conversion means for converting thermal energy to electrical energy are preferably operatively associated with both the first and second ends to maximize utilization of heat derived from the radioisotope charge.

Preferably the radioisotope charge and thermoelectric conversion means are contained within a mounting structure comprising opposed utility plates with intermediate biological shielding structure. Preferably a double seal means seals the mounting structure to permit sealing both at high and low external pressures.

It is a feature of this invention that extremely high power to weight ratios can be obtained in radioisotope thermoelectric generators. Such generators are capable of operating at extremes of underwater pressure as for example at depths of 20,000 feet and pressures of 9,000 pounds per square inch. Galvanic corrosion is minimized and structural strength is extremely high. Radioisotope thermoelectric generators can be made with power ratings of, for example, 25 watts with over-all generator weights of 1,000 pounds.

BRIEF DESCRIPTION OF THE DRAWINGS

The above and other features and advantages of the present invention will be better understood from the following specification when read in connection with the accompanying drawings in which.

DESCRIPTION OF PREFERRED EMBODIMENTS

A preferred embodiment of a thermoelectric generator in accordance with the present invention is illustrated generally at 10 and comprises an outer housing shell 11 and an interior structure 12.

Figures 1, 2:
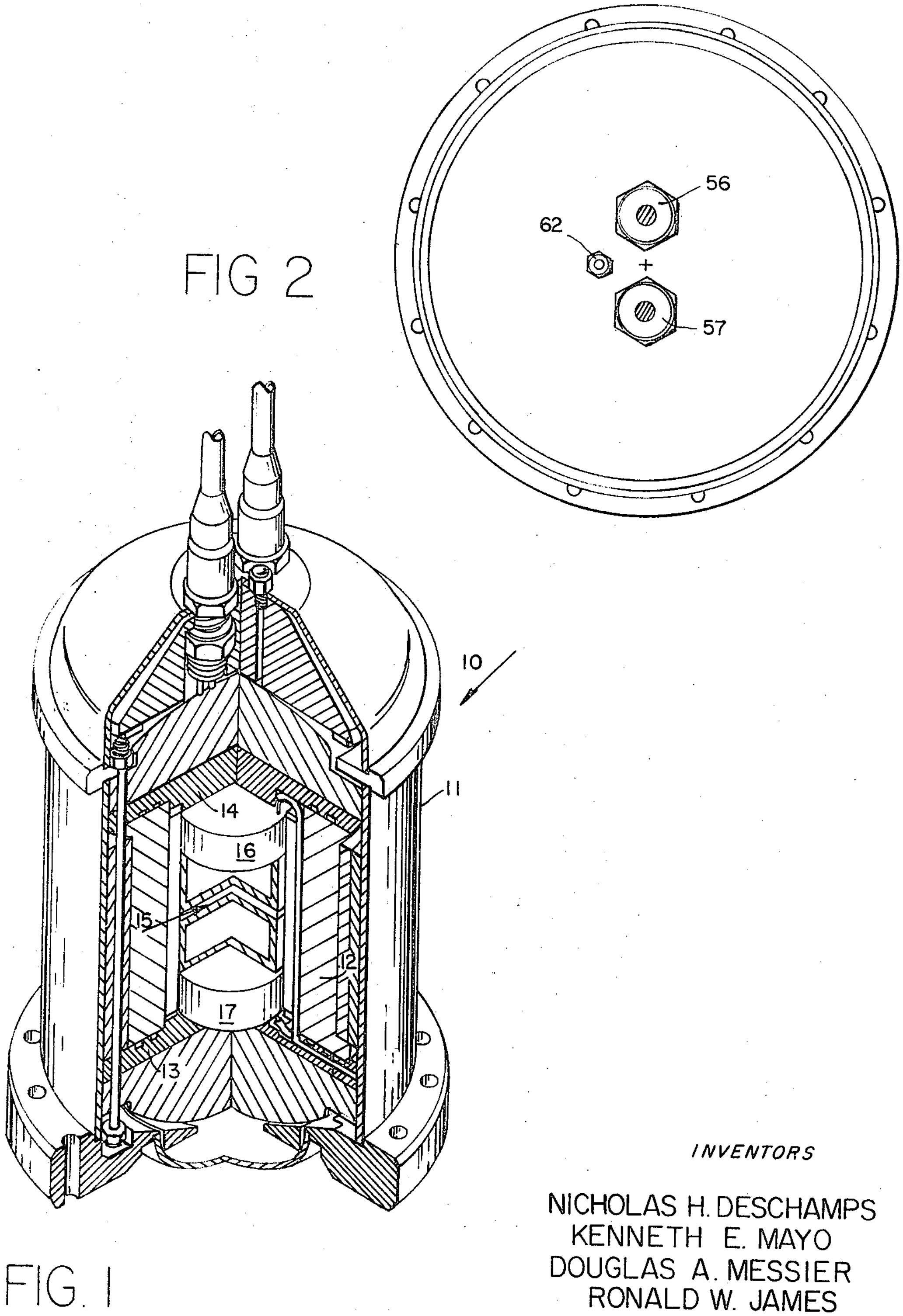
FIG. 1 is a front perspective view with a portion removed of a preferred embodiment of a radioisotope thermoelectric generator in accordance with the present invention.
FIG. 2 is a top view thereof.
Figure 3:
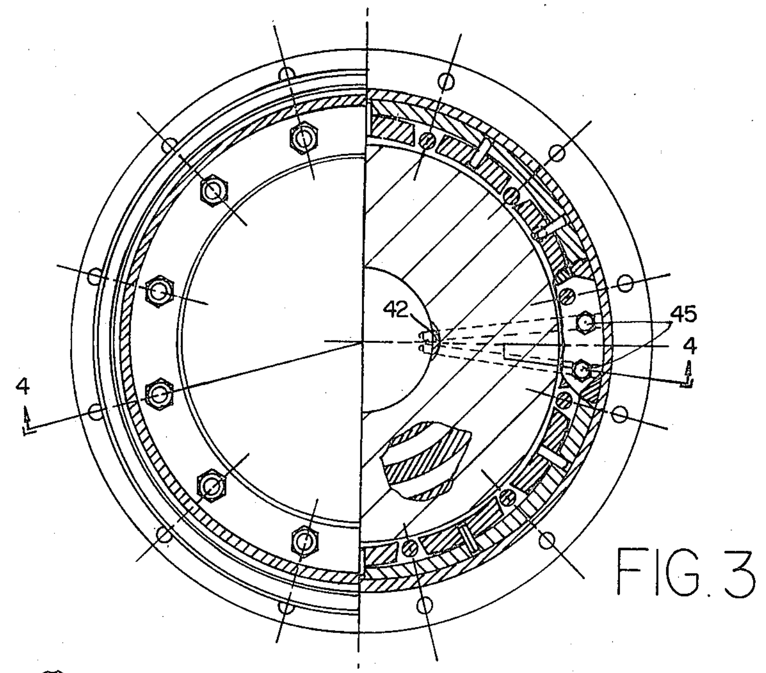
FIG. 3 is a top view thereof with a portion broken way along line 3—3 of FIG. 4.
Figure 4:
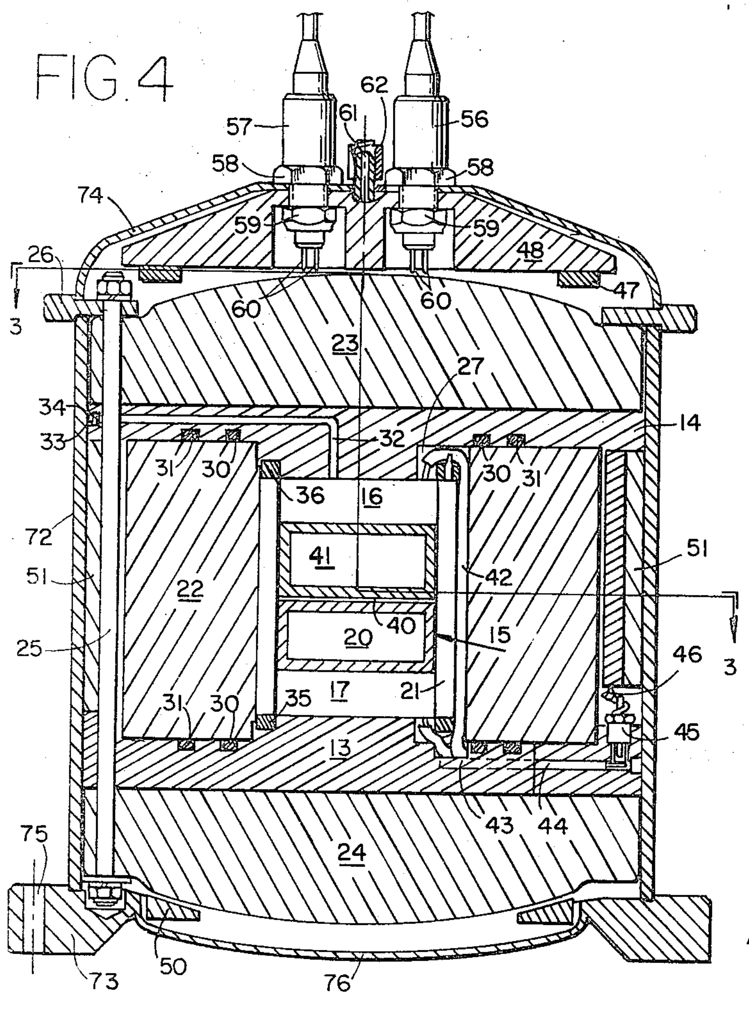
FIG. 4 is a side cross sectional view taken along line 4—4 of FIG. 4.

As best seen in FIG. 4, the interior structure of the thermoelectric generator 10 comprises a mounting structure made up of circular utility plates 13 and 14 between which are positioned a centrally located heat source 15 and operatively associated disc-shaped thermoelectric modules 16 and 17 for converting thermal energy to electrical energy.

The heat source 15 is preferably a pair of steel cylinders containing strontium 90 radioactive material which can be for example $SrTiO_3$ having a 29 year half life. The strontium 90 has high beta emission which is easily shielded due to its high incidence of absorption into dense material which gives rise to a spectrum of gamma rays some of which have the penetrating power of high energy X-rays. Thus, shielding for both man and gamma-sensitive materials is chosen which is preferably of a depleted uranium metal that has been stripped of the fissionable 235 isotope. The strontium 90 is preferably encapsulated in two cylindrical capsules, 20 and 41, each of which is formed by wall providing a first flat end, a second flat end and an intermediate cylindrical section. The disc-shaped thermoelectric modules are axially aligned with the central axis of the fuel capsule as best shown in FIG. 4. Use of a thermoelectric module at both ends of the heat source maximizes utilization of the heat produced by the capsules.

A cylindrical heat insulation shield 21 surrounds the intermediate cylindrical section of the capsules 20 and 41 and preferably extends over both thermoelectric modules. This insulation material considerably cuts down heat transfer through the intermediate section in a radial direction and thus, maximizes heat available, at the flat ends of the fuel capsules 20 and 41, for use in conversion to electrical power.

The insulation shield 21 can be of conventional high temperature material. However, it is preferred to use a novel insulating material which comprises a flat sheet of a thin radiation reflective metal foil such as aluminum having a thickness in the range of from 0.0005 to 0.001 inch and preferably 0.0005 inch with an overlying paper layer having a thickness in the range of from 0.001 to 0.004 and preferably 0.0025 inch. The paper is laid upon the metal foil and a compact spiral winding is made with the ends of the cylindrical shield 21 sealed, into an integral unit which is placed under vacuum conditions prior to assembly. Preferably the heat shield has a wall thickness of at least one-fourth inch with a preferred wall thickness of one-half inch. Even though the metal foil is spirally wound and thus extends from the inside of the cylinder formed to the outside, extremely good heat insulating properties are found to exist.

The radiation shielding for the fuel capsule material is preferably depleted uranium metal which can be machined and worked in conventional metalworking procedures. A cylindrical depleted uranium metal member 22 surrounds the fuel capsule 20 and heat insulator 21. A top end cap 23 and lower end cap 24, both formed of depleted uranium, are provided positioned to assure that no straight line paths for radiation pass from the fuel capsule to the outside of the generator 10.

An interior assembly is formed by interlocking the fuel capsule, thermoelectric moduli, insulation 21, radiation shielding 22, 23 and 24 by means of axially extending locking bolts 25. The bolts 25 are spaced circumferentially about the fuel capsule and pass through predrilled holes in a locking ring 26, utility plate 14, utility plate 13 and end cap shielding 23 and 24 as best sown in FIG. 4. This assembly defines an interior chamber 27 which is evacuated and filled with an insulating inert gas such as argon.

The chamber 27 is sealed by means of double O-rings located intermediate each utility plate and the cylindrical uranium shield 22. The double O-ring seals at each end of shield 22 are identical and only one will be fully described. As best shown in FIG. 4, a resilient inner O-ring 30 is mounted in a preformed annular recess in utility plate 14 with a second resilient O-ring 31 mounted in a second preformed annular recess in the utility plate. Preferably O-ring 30 is a soft rubbery material such as a nitrile rubber resistant to radiation and may for example have a durometer of 60 and preferably no higher than 70. O-ring 31 is composed of a similar material as O-ring 30 but has a durometer preferably no less than 80 and for example 90. O-ring 31 is hard enough to withstand the pressure on the seal at operating pressures of the generator 10 while the seal provided by O-ring 30 is soft enough to permit initial sealing of the chamber 27. The chamber 27 is sealed by O-ring 30 so that air can be evacuated from the chamber through a passageway 32 entirely within the utility plate 14 and passing radially outwardly to provide an evacuation port 33. Air is evacuated and argon introduced through port 33 which can later be capped with a plug member 34 to seal the insulating argon or other inert gas within the chamber 27. The hard and soft seals are necessary since the hard seal would not provide sufficient sealing at atmospheric pressure at which the argon atmosphere is introduced while the soft seal permits sealing at such low pressures. On the other hand, the soft seal is easily destroyed at high pressures in the neighborhood of several thousand pounds per square inch while the hard seal will remain intact maintaining the argon atmosphere within the chamber 27 during use of the device 10.

The utility plates 13 and 14 act to mount the fuel capsule, thermoelectric modules, radiation shielding and insulation shield 21. Preferably heat insulating rings 35 and 36 which may be formed of an insulating material such as graphite felt position the cylinder 21 between the utility plates. Tolerances within the chamber 27 can be taken up by a graphite felt sponge 40 positioned between the two fuel capsules 15 and 41. Suitable electrical wiring 42 and 43 are preferably interconnected in series with the thermoelectric modules 16 and 17 and pass through precut bores 44 in the utility plate 13 to hermetically sealed terminals 45 and 46. Thus the utility plates 13 and 14 provide a mounting structure for sealing of the fuel capsule and thermoelectric modules within the radiation shielding of the housing while permitting access to the chamber 27 for initial adjustment of the atmosphere about the fuel capsule and thermoelectrics and for outward passage of electrical leads.

Electrical leads such as 46 pass from the terminals 45 to a preferably ring-shaped voltage converter 47 which is preferably mounted on an upper aluminum ring 48. The voltage converter can be of any standard type well-known in the art.

The aluminum ring 48 not only acts as a mounting for the voltage converter but also functions as an incompressible filler to take up space within the assembly. Filler materials such as 48 are used since they are made of an incompressible material and withstand high pressures exerted on the casing shell as will be described. Additional fillers are provided within the housing and include a lower aluminum filler ring 50 and a cylindrical aluminum member 51 having interlinked londitudinally extending aluminum filler bars 52 attached thereto by pins 53 to fill in spaces between the bolts 25.

Hermetically sealed power take-off leads 56 and 57 pass through the housing shell and lock the aluminum ring to the shell by use of opposed nuts 58 and 59. Insulated inner contacts 60 are provided by leads 56 and 57. The inner contacts 60 are attached to electrical leads (not shown) from the voltage converter in a conventional manner. An oil filling port 61 is provided passing through the housing shell. Port 61 has a hermetically sealed cap 62 for hermetically sealing the port after evacuation and filling of the housing is carried out.

Turning now to the assembly of the generator 10, the fuel capsules 20 and 41 as well as the graphite sponge 40 are surrounded by the modules 16 and 17 at either end and the cylindrical heat insulating shield 21 applied thereover. Cylindrical radiation shielding 22 is positioned over the capsule and members 40, 41, 35 and 36 positioned. The utility plates 13 and 14 and mounting ring 26 along with shielding end caps 23 and 24 are aligned and the interior structure is bolted together by the circumferentially arranged bolts 25. These elements are pulled together and locked in place, as shown in FIG. 4, by means of locking bolts 70 and conventional washers 71. The bolts 70 compress the soft O-rings 30 so that a hermetic seal is formed at atmospheric pressure. Port 33 is then used to evacuate the chamber 27 which is later filled with one atmosphere of argon or other inert gas and sealed. The utility plates and their associated structure are now ready for encapsulation within the housing shell.

The housing shell is formed by a cylindrical wall 72, lower end plate 73, a portion of ring 26 and upper generally frustoconical cap 74.

Preferably all of elements 26, 72–74 are formed of Hastealloy HY80, a structurally strong steel alloy which is resistant to the corrosive action of sea water. Since only one metal comprises substantially the entire outer housing exposed to sea water in use, galvanic corrosion of dissimilar metals in a housing of this type is avoided.

The lower plate 73 preferably carries mounting holes 75 arranged about an annular outwardly extending flange portion thereof. A central disc-shaped portion 76 of plate 73 is adapted to have an oil can action under high external pressures as will be further described. The cylinder 72 is welded to the flange of member 73 at one end and welded to the mounting ring 26 at its other end as best seen in FIG. 4. Preferably the generally frustro-conical top cap 74 is also welded to the ring 26 after first assembling the aluminum ring 48 along with the power leads and the AC-DC converter. The filler elements 51 and 52 are positioned over the interior assembly prior to positioning of the cylinder 72.

Once the welds are made, oil fill cap 62 is removed, the assembly evacuated and oil introduced to completely fill all spaces within the housing with the exception of the chamber formed at 27. Cap 62 is then applied to hermetically seal the device.

The disc portion 76 has a thinner cross section than any other portion of the outer housing shell. Thus, when the entire generator is immersed in the ocean, at for example depths of 20,000 where pressures reach 9,000 pounds per square inch, the end cap has an oil can action. Thus portion 76 is pressed inwardly which causes compressing of the filling oil to a point where the outside pressure is transmitted directly to the interior structure. The radiation shielding materials as well as the utility plates and fillers support the housing and counteract the high outside pressure. Thus the incompressible solids within the housing cause equalization of the pressure on the inside and outside of each portion of the housing shell. This feature is extremely important in permitting relatively lightweight housing shells to be used which have sufficient strength to support the structure at atmospheric pressure and high corrosion resistant properties permitting long life, yet, do not have sufficient structural strength to overcome significant pressure loads. Upon lowering of outside pressure, member 76 will flex back to its original position as the interior filling oil expands.

In the specific embodiment of this invention, the over-all axial length of the generator 10 is 18.5 inches and its largest diameter 16 inches. The outer shell is made of Hastealloy HY80 with section 76 having a thickness of one-fourth inch which is approximately half the thickness of the remaining shell. Capsule 20 contains strontium 90 in the form of $SrTiO_3$ having a 29-year half life and capable of producing 432 thermal watts equivalent to 118,000 curies. Modules 16 and 17 are connected in series and comprise segmented silicone germanium: lead telluride thermoelectrics. The shielding material is depleted uranium with shield 22 having a radial thickness of 3 inches. One atmosphere of argon is introduced into chamber 27 and the chamber hermetically sealed by seal 30 made of a nitrile rubber. Suitable electrical connections are made to a voltage converter which steps the voltage from 3 volts to 2B volts and from the converter to power leads 56 and 57. Mineral oil is introduced to completely fill the interior of the housing shell.

This generator is capable of producing 25 electrical watts with an over-all weight of 1,000 pounds and is resistant to pressures of at least 9,000 pounds per square inch.

While a specific embodiment of the present invention has been shown and described, it should be understood that many variations thereof are possible. For example, while a cylindrical housing is preferred, with all of the elements coaxially aligned, other shapes can be used. Similarly, the specific material of the heat source can vary greatly. Conventionally used heat source materials which provide sufficient heat energy to act as a power supply can be used. The thermoelectric modules can vary greatly. In some cases, one fuel capsule or more than two fuel capsules can be used in the central position as for example with thermoelectrics at either end of a plurality of aligned disc-shaped fuel capsules. The fuel capsule can be spherical or have other shapes. The utility plates can vary in design and configuration although in all cases it is preferred that they mount the shielding material and provide for location of the fuel capsule within the shielding material so that no straight line radiation from the fuel capsule is capable of passing to the area surrounding the shielding. The specific shape, material and size of the various filler elements used can vary depending upon the shape and size of the over-all generator, although in all cases it is preferred that materials having less compressibility than the compressibility of the fluid used be employed for filler materials. The use of a liquid to transfer outside pressure to interior solid structure can find application outside of the generator field. Thus the housing of this invention can be used to enclose a variety of different devices.

In view of the many modifications possible, this invention is to be limited only by the spirit and scope of the appended claims.

What is claimed is:

1. A thermoelectric generator comprising an interior structure comprising a hollow open-ended cylindrically shaped biological shielding material,
 first and second utility support plates arranged at and in contact with the top and bottom ends of said interior structure, said support plates closing said open ends,
 top and bottom end caps comprising a biological shielding material arranged at and in contact with the outer surfaces of said first and second support plates, respectively,
 a hermetically sealed outer housing shell enclosing said interior structure, said support plates, and said end caps,
 a radioisotopic heat source located within said interior structure,
 thermoelectric conversion means located between said support plates and said heat source within said interior structure for converting the energy of said heat source to electrical energy,
 means for coupling electrical energy from said conversion means to the outside of said outer housing shell,
 said all portions of interior structure having greater compressive strength than said outer housing shell,
 and a substantially incompressible static fluid lying between said outer housing shell and said biological shielding material so that high pressure forces acting on the outside of said shell are transmitted to and supported by said interior structure.

2. A thermoelectric generator in accordance with claim 1 wherein the entire outer housing shell is formed of a corrosion resistant high strength material.

3. A thermoelectric generator in accordance with claim 2 wherein a portion of said outer housing shell has a predetermined thickness less than the thickness of other portions of said shell so that said forces are transmitted to said interior structure after movement of said predetermined thickness portion.

4. A thermoelectric generator in accordance with claim 1 wherein said first and second utility plates and said annular interior structure define an interior chamber for carrying conversion means for converting the energy of said heat source to electrical energy.

5. A thermoelectric generator in accordance with claim 4 and further comprising first and second seal means for sealing said chamber said first seal means being softer than said second seal means.

6. A thermoelectric generator in accordance with claim 5 wherein said first and second means comprise O-rings.

7. A thermoelectric generator in accordance with claim 4 and further comprising substantially incompressible solid filler means positioned within said housing shell.

8. A thermoelectric generator in accordance with claim 4 and further comprising a mounting ring and means for locking said heat source, utility plates, radiation shielding member and additional radiation shielding end caps to said mounting ring.

* * * * *